US011223815B2

(12) United States Patent
Li et al.

(10) Patent No.: US 11,223,815 B2
(45) Date of Patent: Jan. 11, 2022

(54) METHOD AND DEVICE FOR PROCESSING VIDEO

(71) Applicant: Samsung Electronics Co., Ltd., Gyeonggi-do (KR)

(72) Inventors: Weiming Li, Beijing (CN); Wenbo Zhang, Beijing (CN); Hao Wang, Beijing (CN); Yang Liu, Beijing (CN); Zairan Wang, Beijing (CN)

(73) Assignee: Samsung Electronics Co., Ltd

( * ) Notice: Subject to any disclaimer, the term of this patent is extended or adjusted under 35 U.S.C. 154(b) by 4 days.

(21) Appl. No.: 16/652,601

(22) PCT Filed: Oct. 25, 2018

(86) PCT No.: PCT/KR2018/012748
§ 371 (c)(1),
(2) Date: Mar. 31, 2020

(87) PCT Pub. No.: WO2020/085541
PCT Pub. Date: Apr. 30, 2020

(65) Prior Publication Data
US 2021/0227192 A1    Jul. 22, 2021

(51) Int. Cl.
*G06T 15/20* (2011.01)
*H04N 13/246* (2018.01)
(Continued)

(52) U.S. Cl.
CPC ....... *H04N 13/246* (2018.05); *G06K 9/00711* (2013.01); *G06K 9/6217* (2013.01);
(Continued)

(58) Field of Classification Search
CPC .. H04N 13/246; H04N 13/128; H04N 13/243; H04N 2013/0081; H04N 13/296;
(Continued)

(56) References Cited

U.S. PATENT DOCUMENTS 9,888,228 B1 * 2/2018 Lacaze ................. G02B 17/002
10,855,968 B2 * 12/2020 Choi .................... H04N 13/194
(Continued)

FOREIGN PATENT DOCUMENTS

JP       2011160299       8/2011
WO   WO 2016/154123       9/2016
(Continued)

OTHER PUBLICATIONS

PCT/ISA/210 Search Report dated Jul. 25, 2019 issued on PCT/KR2018/012748, pp. 3.
(Continued)

*Primary Examiner* — Howard D Brown, Jr.
(74) *Attorney, Agent, or Firm* — The Farrell Law Firm, P.C.

(57) ABSTRACT

The method of the present invention for processing a video comprises: acquiring a first and a second omnidirectional videos having a stereoscopic parallax in a first direction which is a corresponding column direction when the first and the second omnidirectional videos are unfolded by longitude and latitude; and, determining one or two third omnidirectional videos according to the first and the second omnidirectional videos, the second and the third omnidirectional videos having a stereoscopic parallax in a second direction, wherein, if one third omnidirectional video is determined, the second and the third omnidirectional videos have a stereoscopic parallax in the second direction; if two third omnidirectional videos are determined, the two third omnidirectional videos have a stereoscopic parallax in the second direction; and, the second direction is a corresponding row direction when the first and the second omnidirectional videos are unfolded by longitude and latitude.

18 Claims, 10 Drawing Sheets

(51) Int. Cl.
  *G06T 7/593* (2017.01)
  *H04N 13/128* (2018.01)
  *H04N 13/243* (2018.01)
  *G06K 9/00* (2006.01)
  *G06K 9/62* (2006.01)
  *G06K 9/72* (2006.01)
  *H04N 13/00* (2018.01)

(52) U.S. Cl.
  CPC .............. *G06K 9/726* (2013.01); *G06T 7/593* (2017.01); *H04N 13/128* (2018.05); *H04N 13/243* (2018.05); *G06T 2207/10021* (2013.01); *G06T 2207/20084* (2013.01); *H04N 2013/0081* (2013.01)

(58) Field of Classification Search
  CPC .. H04N 13/282; H04N 13/111; H04N 13/239; H04N 13/204; G06T 7/593; G06T 2207/10021; G06T 2207/20084; G06T 7/38; G06K 9/00711; G06K 9/6217; G06K 9/726
  See application file for complete search history.

(56) References Cited

U.S. PATENT DOCUMENTS

| | | | |
|---|---|---|---|
| 2013/0128121 A1 | 5/2013 | Agarwala et al. | |
| 2013/0258066 A1 | 10/2013 | Asano | |
| 2014/0118488 A1 | 5/2014 | Steuart, III | |
| 2016/0335795 A1* | 11/2016 | Flynn | G06K 9/4652 |
| 2017/0150236 A1 | 5/2017 | Newman et al. | |
| 2017/0237963 A1 | 8/2017 | Cook | |
| 2018/0027257 A1* | 1/2018 | Izumi | G06T 9/00 386/328 |
| 2018/0139433 A1* | 5/2018 | Fink | G02B 7/021 |
| 2018/0184077 A1 | 6/2018 | Kato | |
| 2018/0234669 A1 | 8/2018 | Chen et al. | |
| 2018/0293713 A1 | 10/2018 | Vogels et al. | |
| 2018/0365798 A1* | 12/2018 | Woo | G06T 3/0062 |

FOREIGN PATENT DOCUMENTS

| | | | | |
|---|---|---|---|---|
| WO | WO-2016154123 A2 * | 9/2016 | | G06F 3/012 |
| WO | WO 2018/174535 | 9/2018 | | |

OTHER PUBLICATIONS

PCT/ISA/237 Written Opinion dated Jul. 25, 2019 issued on PCT/KR2018/012748, pp. 7.
Shigang Li, "Binocular Spherical Stereo", XP 11347139, IEEE Transactions on Intelligent Transportation Systems, vol. 9, No. 4, Dec. 2008, 12 pages.
Hansung Kim et al., "Room Layout Estimation with Object and Material Attributes Information using a Spherical Camera", XP 033027660, 2016 Fourth International.
Conference on 3D Vision, Oct. 25, 2016, 9 pages.
European Search Report dated Jul. 20, 2021 issued in counterpart application No. 18934519.2-1209, 18 pages.
Andrea Pilzer et al., "Unsupervised Adversarial Depth Estimation using Cycled Generative Networks", XP033420097, 2018 International Conference on 3D Vision, 2018, 9 pages.
Mostafa Kamali et al., "Stabilizing Omnidirectional Videos Using 3D Structure and Spherical Image Warping", XP055361709, MVA2011 IAPR Conference.
On Machine Vision Applications, Jun. 13-15, 2011, 4 pages.
European Search Report dated Nov. 3, 2021 issued in counterpart application No. 18934519.2-1209, 27 pages.

* cited by examiner

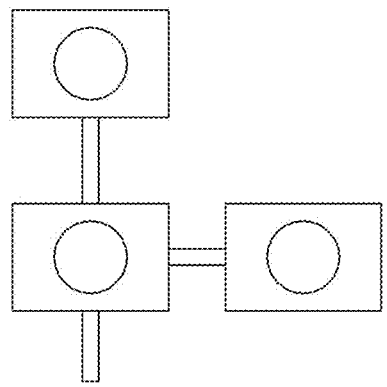
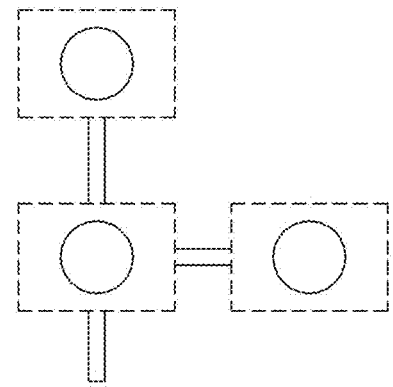
FIG.8  FIG.9
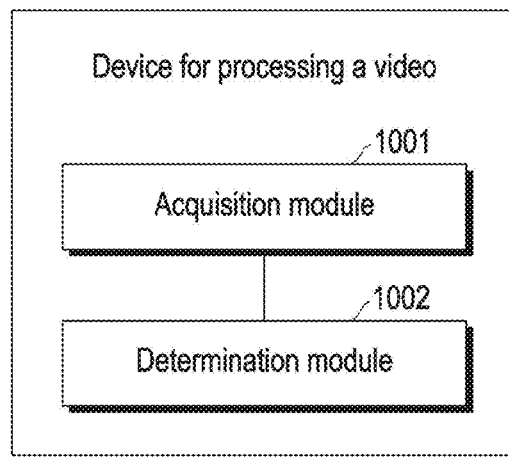
FIG.10

METHOD AND DEVICE FOR PROCESSING VIDEO

PRIORITY

This application is a National Phase Entry of International Application No. PCT/KR2018/012748, which was filed on Oct. 25, 2018, the content of which is incorporated herein by reference.

TECHNICAL FIELD

The present invention relates to the technical field of video processing, and in particular to a method and device for processing a video.

BACKGROUND ART

With the development of information technology, the multimedia technology and the Three Dimensional (3D) omnidirectional photography technology also develops rapidly, wherein the 3D omnidirectional photography technology has a promising application prospect. For example, the 3D omnidirectional photography technology can be applied to various fields such as Virtual Reality (VR) meeting, VR live broadcast, wearable devices, navigation systems, robots and unmanned aerial vehicles.

DISCLOSURE OF INVENTION

Technical Problem

Wherein, the 3D omnidirectional photography technology is applied to 3D omnidirectional video acquisition equipments. In an existing 3D omnidirectional video acquisition equipment, a multiple of video acquisition equipments are mounted on a spherical surface or a circular surface of a round sphere, as shown in FIGS. 1a and 1b, each video acquisition equipment acquires videos in a corresponding direction, and the videos acquired in various directions are processed to obtain a 3D omnidirectional video. In the existing 3D omnidirectional video acquisition equipments, the multiple of video acquisition equipments (e.g., cameras) are arranged to form a number of stereo pairs viewing various directions. Such design requires a sufficient number of stereo pairs to be used to cover the full range of omnidirectional field of view. Also, each stereo pair needs sufficient stereo baseline length to ensure enough stereo image disparity. Thus, the existing 3D omnidirectional video acquisition equipments are large in size, difficult to carry and high in cost. Consequently, the existing 3D omnidirectional video acquisition equipments are difficult to be applied to the everyday life scenario of an individual user, and are difficult to realize functions such as live show, daily life recording, and sports photography. Therefore, most of such existing 3D omnidirectional video acquisition equipments are only applied to business scenarios without portability needs and they result in low user experience for individual users that needs a light weighted, compact, and affordable device for daily life usage.

Solution to Problem

To overcome or at least partially solve the technical problems, the following technical solutions are particularly provided.

According to one aspect, the embodiments of the present invention provide a method for processing a video, comprising the steps of:

acquiring a first omnidirectional video and a second omnidirectional video, the first omnidirectional video and the second omnidirectional video having a stereoscopic parallax in a first direction, the first direction being a corresponding column direction when the first omnidirectional video and the second omnidirectional video are unfolded by longitude and latitude; and determining one or two third omnidirectional videos according to the first omnidirectional video and the second omnidirectional video, wherein, if one third omnidirectional video is determined, the second omnidirectional video and the third omnidirectional video have a stereoscopic parallax in a second direction; if two third omnidirectional videos are determined, the two third omnidirectional videos have a stereoscopic parallax in the second direction; and, the second direction is a corresponding row direction when the first omnidirectional video and the second omnidirectional video are unfolded by longitude and latitude.

According to another aspect, the embodiments of the present invention further provide a device for processing a video, comprising:

an acquisition module configured to acquire a first omnidirectional video and a second omnidirectional video, the first omnidirectional video and the second omnidirectional video having a stereoscopic parallax in a first direction, the first direction being a corresponding column direction when the first omnidirectional video and the second omnidirectional video are unfolded by longitude and latitude; and a determination module configured to determine one or two third omnidirectional videos according to the first omnidirectional video and the second omnidirectional video, wherein, if one third omnidirectional video is determined, the second omnidirectional video and the third omnidirectional video have a stereoscopic parallax in a second direction; if two third omnidirectional videos are determined, the two third omnidirectional videos have a stereoscopic parallax in the second direction; and, the second direction is a corresponding row direction when the first omnidirectional video and the second omnidirectional video are unfolded by longitude and latitude.

Advantageous Effects of Invention

The present invention provides a method and device for processing a video. Compared with the prior art, in the present invention, two omnidirectional videos (i.e., a first omnidirectional video and a second omnidirectional video, respectively) having a stereoscopic parallax in a first direction are acquired, and a third omnidirectional video is then determined according to the first omnidirectional video and the second omnidirectional video, wherein the second omnidirectional video and the third omnidirectional video have a stereoscopic parallax in a second direction. In other words, in the present invention, it is only required to acquire two omnidirectional videos having a stereoscopic parallax in a first direction. Subsequently, through omnidirectional video conversion from the stereoscopic parallax in the first direction to the stereoscopic parallax in the second direction, a third omnidirectional video in a same row direction of the second omnidirectional video can be obtained, or two third omnidirectional videos with stereoscopic parallax in a same row direction can be obtained. Thus, this provides for a possibility and premise for the combination of the second omnidirectional video and the third omnidirectional video to present a 3D omnidirectional video effect to a user or the combination of two third omnidirectional videos to present a 3D omnidirectional video effect to the user. Meanwhile, video acquisition can be completed by only two omnidirectional video acquisition equipments. This equipment structure can greatly reduce the size of the omnidirectional video acquisition equipments and reduce the cost. Thanks to the features of portability, small size and low cost of the omnidirectional video acquisition equipments, the application scenarios of the omnidirectional video acquisition equipments can be increased, and the user experience is thus improved.

Additional aspects and advantages of the present invention will be partially appreciated and become apparent from the descriptions below, or will be well learned from the practices of the present invention.

BRIEF DESCRIPTION OF DRAWINGS

The above and/or additional aspects and advantageous of the present invention will become apparent and be more readily appreciated from the following descriptions of embodiments, with reference to the accompanying drawings, in which:

FIG. 8 is a schematic diagram of a method for generating a training sample according to an embodiment of the present invention;

FIG. 9 is a schematic diagram of another method for generating a training sample according to an embodiment of the present invention; and FIG. 10 is a schematic diagram of a device for processing a video according to an embodiment of the present invention.

MODE FOR THE INVENTION

Figure 1A:
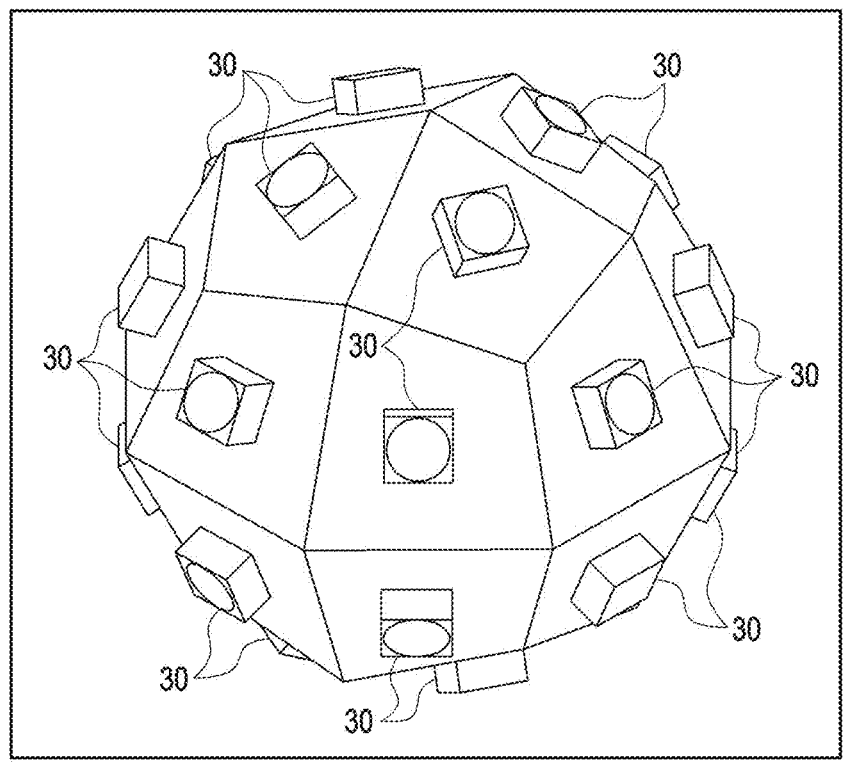
FIG. 1a is a schematic diagram of an existing 3D omnidirectional video acquisition equipment.
Figure 1B:
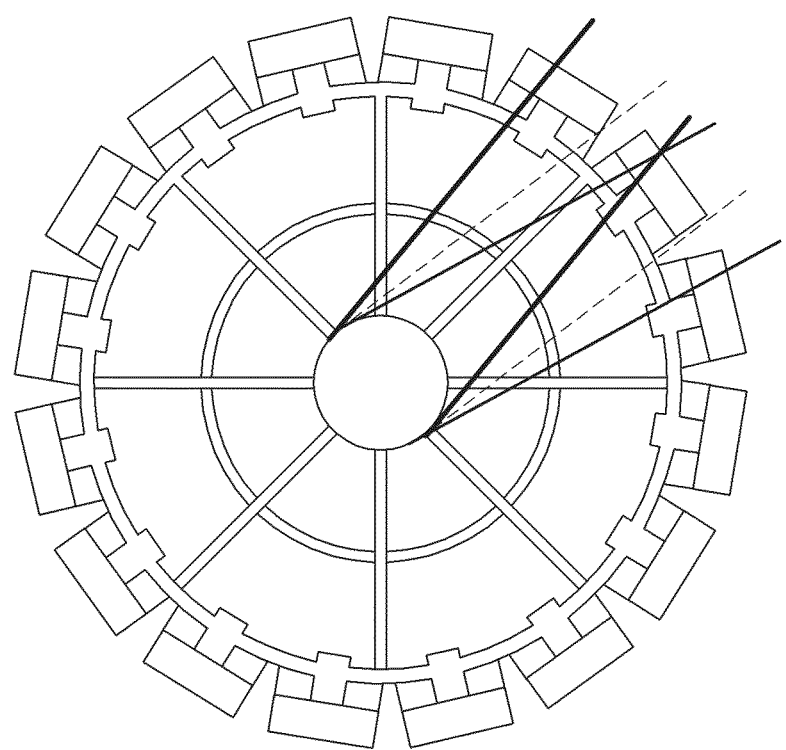
FIG. 1b is a schematic diagram of another existing 3D omnidirectional video acquisition equipment.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

Embodiment 1

Figure 2:
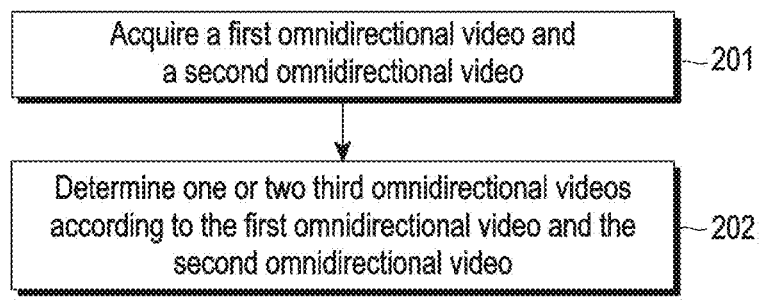
FIG. 2 is a flowchart of a method for processing a video according to an embodiment of the present invention.

This embodiment of the present invention provides a method for processing a video, as shown in FIG. 2, comprising the following steps.

Step 201: A first omnidirectional video and a second omnidirectional video are acquired.

Wherein, the first omnidirectional video and the second omnidirectional video have a stereoscopic parallax in a first direction.

In this embodiment of the present invention, when the first omnidirectional video and the second omnidirectional video are unfolded by longitude and latitude, respectively, the direction of a line of the selected longitude poles coincides with the direction of a line of optical centers of the two omnidirectional videos (the first omnidirectional video and the second omnidirectional video), and the selected zero latitude planes for the two videos coincides with the optical centers of the two videos respectively. The row direction of the unfolded videos corresponds to the latitude direction, and the column direction corresponds to the longitude direction; and the first direction is a corresponding column direction when the first omnidirectional video and the second omnidirectional video are unfolded by longitude and latitude.

Wherein, the first omnidirectional video can be an upper-viewpoint omnidirectional video, and the second omnidirectional video can be a lower-viewpoint omnidirectional video; or, the first omnidirectional video is a lower-viewpoint omnidirectional video, and the second omnidirectional video is an upper-viewpoint omnidirectional video. This will not be limited in this embodiment of the present invention.

Figure 3A:
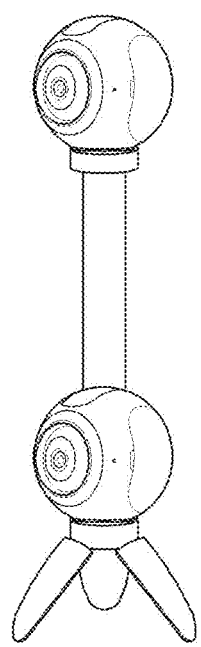
FIG. 3a is a schematic diagram of an omnidirectional video acquisition equipment according to an embodiment of the present invention.

In this embodiment of the present invention, the first omnidirectional video and the second omnidirectional video can be acquired by the omnidirectional video acquisition equipment shown in FIG. 3a.

Wherein, the omnidirectional video acquisition equipment shown in FIG. 3a can comprise two video acquisition equipments in a same vertical direction, wherein the two video acquisition equipments in the same vertical direction can be connected by a telescopic rod.

Figure 3B:
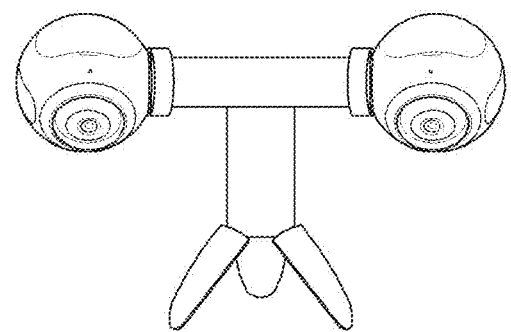
FIG. 3b is a schematic diagram of an omnidirectional video acquisition equipment consisting of two video acquisition equipments in a same horizontal direction.

In this embodiment of the present invention, the omnidirectional video acquisition equipment can also consist of two video acquisition equipments in a same horizontal direction, wherein the two video acquisition equipments in the same horizontal direction can also be connected by a telescopic rod, as shown in FIG. 3b. In this embodiment of the present invention, the direction of the two video acquisition equipments in a same horizontal direction can be changed, in order to adapt to this embodiment of the present invention.

Figure 3C:
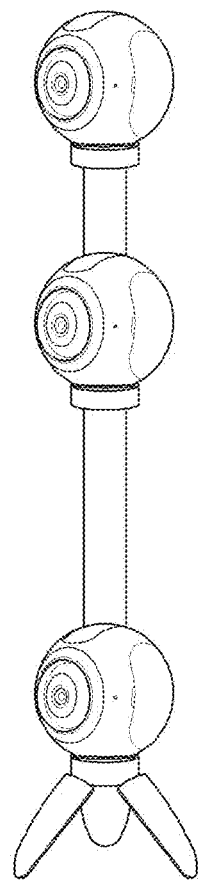
FIG. 3c is a schematic diagram of an omnidirectional video acquisition equipment consisting of a multiple of video acquisition equipments in a same vertical direction.

In this embodiment of the present invention, the omnidirectional video acquisition equipment can comprise a multiple of video acquisition equipments in a same vertical direction, wherein the video acquisition equipments in the same vertical direction can be connected by a telescopic rod, and any two of the video acquisition equipments can be applied in this embodiment of the present invention, as shown in FIG. 3c. Any two of the multiple video acquisition equipments can form a pair of video acquisition equipment as shown in FIG. 3a and FIG. 3b, which also performs the same functions as those in FIG. 3a and FIG. 3b. By selecting different combinations of two video acquisition equipments from the multiple ones, the selected video acquisition equipment pair has different baseline lengths between the optical centers of the device pair. It is well known that, depth estimation accuracy is related to the baseline length of a pair of cameras. Specifically, longer baseline leads to higher depth estimation accuracy. During applications, when most objects of interests are far from the system, the system can select a device pair with long baseline. Meanwhile, when most objects of interests are far from the system, the system can select a device pair with short baseline.

Figure 3D:
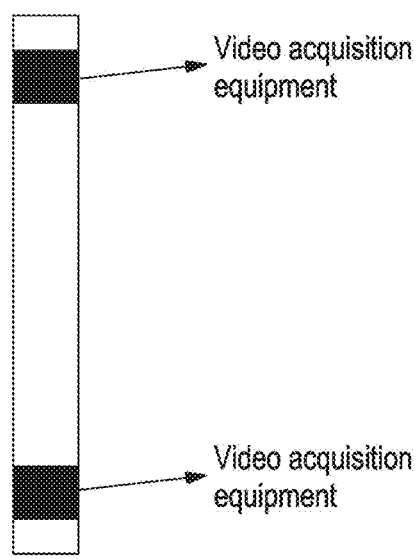
FIG. 3d is a schematic diagram of another omnidirectional video acquisition equipment according to an embodiment of the present invention.

In this embodiment of the present invention, the omnidirectional video acquisition equipment can comprise two video acquisition equipments in a same vertical direction, wherein the two video acquisition equipments in the same vertical direction are embedded into a telescopic rod, as shown in FIG. 3d.

The vertical direction mentioned in this application refers to a direction that is consistent or near the gravity direction. The systems and methods in the application do not require this direction to be strictly the gravity direction.

Wherein, the telescopic rod can be a connecting rod having a fixed length; or can have a set of connecting rods having different lengths, which can be replaced manually; or, can have only one connecting rod which can adjust the length of the connecting rod between the omnidirectional video acquisition equipments by manual operations; or, can have only one connecting rod which can automatically adjust the length of the connecting rod between the omnidirectional video acquisition equipments.

In this embodiment of the present invention, the omnidirectional video acquisition equipment shown in FIGS. 3a, 3b, 3c and 3d requires only two video acquisition equipments connected by a telescopic rod, so that the size of the omnidirectional video acquisition equipment is greatly decreased, and the cost is reduced. Moreover, thanks to the features of portability, small size and low cost of the omnidirectional video acquisition equipment, the application scenarios of the omnidirectional video acquisition equipment can be increased, and the user experience is thus improved.

Optionally, after the step 201, the method further comprises: calibrating the first omnidirectional video and the second omnidirectional video.

Wherein, the step of calibrating the first omnidirectional video and the second omnidirectional video can specifically comprise: determining, according to the first omnidirectional video and the second omnidirectional video, position and pose error parameters of video acquisition equipments corresponding to the first omnidirectional video and the second omnidirectional video; determining calibration parameters according to the position and pose error parameters; and, calibrating the first omnidirectional video and the second omnidirectional video according to the calibration parameters.

In the practical equipment production and assembly process, since the two video acquisition equipments in a same vertical direction inevitably have errors in position and pose, calibration parameters corresponding to each video acquisition equipment need to be adjusted, so that the purpose of calibrating the acquired first omnidirectional video and second omnidirectional video is achieved.

In this embodiment of the present invention, images of the first omnidirectional video and the second omnidirectional video are unfolded, respectively, and a pixel point is extracted from the unfolded image of the first omnidirectional video; then, a pixel point corresponding to this pixel point is found from the unfolded image of the second omnidirectional video, and it is determined whether the two pixel points are in a same column direction; if the two pixel points are not in a same column direction, the calibration parameters corresponding to the two video acquisition equipments in a same vertical direction are adjusted to ensure that the two corresponding pixel points are in a same column direction.

Wherein, by unfolding by longitude and latitude on the spherical surface, an omnidirectional video taken by the omnidirectional video acquisition equipment can be converted from a 360° spherical image into a planar image unfolded by longitude and latitude. Specifically, a three dimensional coordinate system O-XYZ is defined in the center of the spherical surface, where the point O is a center point of the coordinate system, and X, Y and Z are three directions perpendicular to each other. Ideally, if the two camera optical centers form a base line at vertical direction, X and Y are in a horizontal plane, and Z points upward along the vertical base line direction. In the converted planar image, the column coordinate of the image corresponds to an angle range from −90° to 90° in a vertical plane in the spherical coordinate system, and the column coordinate of the image corresponds to an angle range from 0° to 360° in the horizontal plane in the spherical coordinate system.

In this embodiment of the present invention, it is assumed that, for two omnidirectional images (an upper-viewpoint omnidirectional image and a lower-viewpoint omnidirectional image) taken by the system at a certain moment of time, the spherical coordinate systems are O1-X1Y1Z1 and O2-X2Y2Z2, respectively. Wherein, ideally, Z1 coincides with the direction of the line O1O2, Z2 coincides with the direction of Z1, X1 is parallel to X2, and Y1 is parallel to Y2. Wherein, ideally, after the two omnidirectional images are converted into images unfolded by longitude and latitude, a same object point in the space has the same column coordinate in the two images unfolded by longitude and latitude.

Wherein, when it is detected that the same object point in the space has different column coordinates in the two images unfolded by longitude and latitude, it is indicated that the spherical coordinate systems of the two video acquisition equipments are not aligned to an ideal state. In this case, the spherical coordinate system of at least one of the two video acquisition equipments needs to be rotated around its center so that the spherical coordinate systems are aligned to an ideal state.

For example, this rotation can be represented by rotating around the X, Y, and Z axis directions by angles [Ax,Ay,Az] respectively. Wherein, [Ax,Ay,Az] is automatically calculated by a self-calibration method.

Optionally, in this embodiment of the present invention, the method can further include a step a (not shown), wherein, in the step a, timestamps respectively corresponding to the first omnidirectional video and the second omnidirectional video are synchronized.

Wherein, the step a can be performed after the step of calibrating the first omnidirectional video and the second omnidirectional video or after the step 201. This will not be limited in this embodiment of the present invention.

In this embodiment of the present invention, a first feature pixel point is acquired from the first omnidirectional video, and a second feature pixel point corresponding to the first feature pixel point is determined in the second omnidirectional video; then, movement trajectories corresponding to the first feature pixel point and the second feature pixel point are determined, respectively, sampling feature extraction (e.g., a trajectory turning point at which the direction of movement changes suddenly) is performed on the movement trajectory corresponding to the first feature pixel point to obtain a first sampling point, and similar sampling feature extraction is performed on the movement trajectory corresponding to the second feature point to obtain a second sampling point corresponding to the first sampling point; subsequently, it is determined whether the first sampling point and the second sampling point are aligned (or in a same vertical line) on a same time axis; and, if the first sampling point and the second sampling point are not aligned, the second sampling point can be adjusted according to the time corresponding to the first sampling point on the time axis, or the first sampling point can be adjusted according to the time corresponding to the second sampling point on the time axis, so as to synchronize timestamps respectively corresponding to the first omnidirectional video and the second omnidirectional video.

In another way, the timestamps respectively corresponding to the first omnidirectional video and the second omnidirectional video are synchronized according to the time in a third-party terminal or a cloud server.

Figure 4:
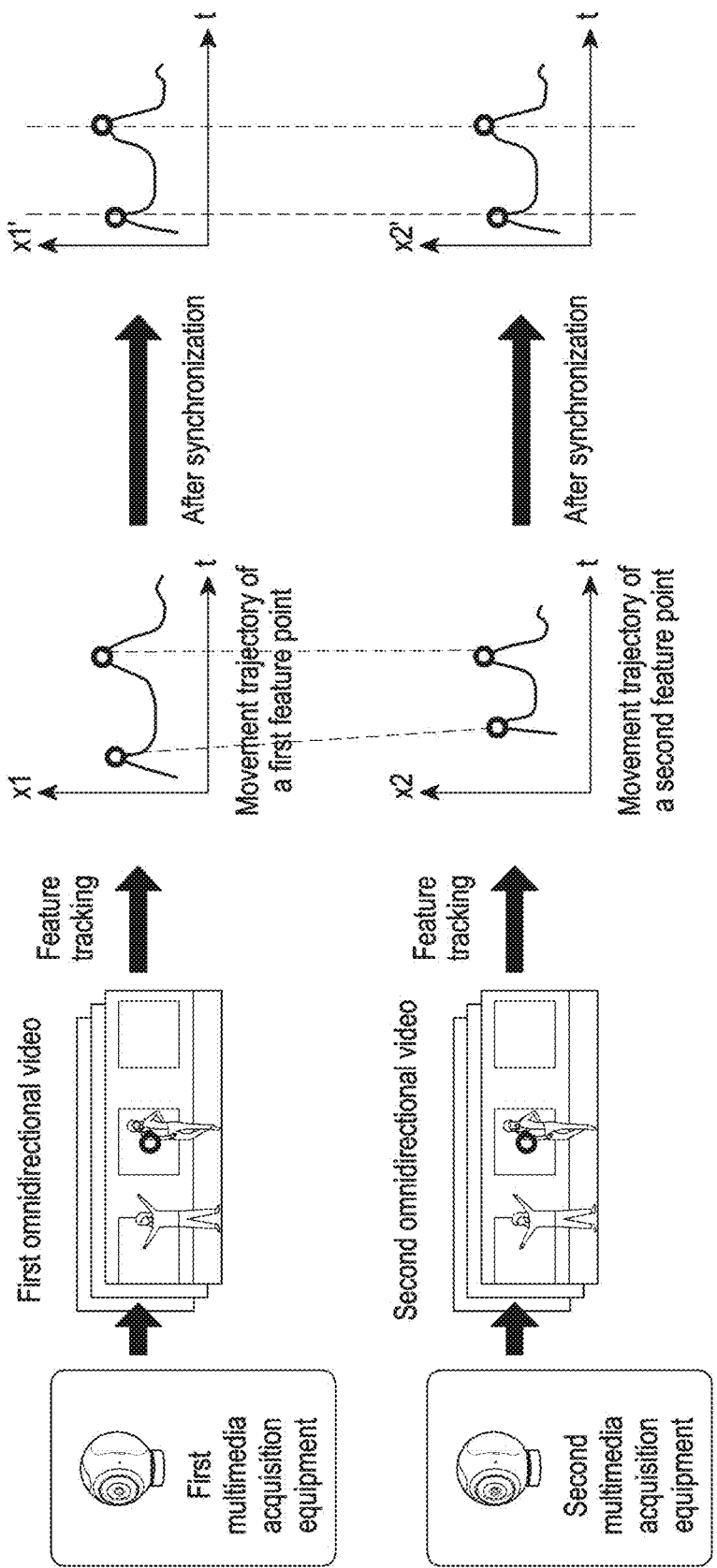
FIG. 4 is a schematic diagram of a method for synchronizing timestamps according to an embodiment of the present invention.

Wherein, the specific process of synchronizing timestamps is shown in FIG. 4.

Step 202: One or two third omnidirectional videos are determined according to the first omnidirectional video and the second omnidirectional video.

Wherein, if one third omnidirectional video is determined, the second omnidirectional video and the third omnidirectional video have a stereoscopic parallax in a second direction; if two third omnidirectional videos are determined, the two third omnidirectional videos have a stereoscopic parallax in the second direction; and, the second direction is a corresponding row direction when the first omnidirectional video and the second omnidirectional video are unfolded by longitude and latitude.

For example, if the first direction is a vertical direction and the second direction is a horizontal direction, a first omnidirectional video and a second omnidirectional video having a stereoscopic parallax in the vertical direction are acquired, and one or two third omnidirectional videos are determined according to the first omnidirectional video and the second omnidirectional video, wherein, if one third omnidirectional video is determined, the second omnidirectional video and the third omnidirectional video have a stereoscopic parallax in the horizontal direction; and, if two third omnidirectional videos are determined, the two third omnidirectional videos have a stereoscopic parallax in the horizontal direction.

Wherein, the step 202 comprises steps 2021 to 2022 (not shown).

Step 2021: An omnidirectional depth video is determined according to the first omnidirectional video and the second omnidirectional video.

Specifically, the step 2021 comprises a step 20211 (not shown).

Step 20211: The omnidirectional depth video is determined according to the first omnidirectional video and the second omnidirectional video and by using a trained deep neural network.

In this embodiment of the present invention, the step 20211 specifically comprises steps 20211a, 20211b, 20211c and 20211d (not shown), wherein:

Step 20211a: Based on the deep neural network, pixel points in the second omnidirectional video that is matched with pixel points in the first omnidirectional video is determined.

Step 20211b: Depth information corresponding to each pair of matched pixel points is determined.

Step 20211c: Based on the deep neural network, semantic annotation is performed on each pixel point in the second omnidirectional video.

Step 20211d: The omnidirectional depth video is determined according to the depth information corresponding to each pair of matched pixel points and the semantic annotation information corresponding to each pixel point in the second omnidirectional video.

In this embodiment of the present invention, the deep neural network for the omnidirectional depth video comprises: a stereoscopic matching unit based on a Deep Neural Network (DNN), a depth image estimation unit based on stereoscopic matching, an image semantic segmentation unit based on a DNN, an object geometric model estimation unit, a semantic depth image generation unit, and an omnidirectional depth image output unit.

Wherein, the depth image estimation unit based on stereoscopic matching performs pixel matching and determines depth information corresponding to each pair of matched pixel points. Wherein, the process of pixel matching and determining depth information corresponding to each pair of matched pixel points is specifically described below.

In the first step, a first omnidirectional image OImage1 and a second omnidirectional image OImage2 unfolded by longitude and latitude are input.

In the second step, the following operations are performed on each pixel p1 in the OImage1:

(1) for each pixel p2$r$ in the OImage2, which is in the same column as p1, p1 and p2 are compared in terms of similarity and the value of similarity is represented by S(p1,p2$r$), and a pixel having the maximum value of S(p1, p2$r$) among all pixels p2$r$ is found and recorded as p2;

wherein, S(p1,p2$r$)=D(d1,d2$r$), where D is a deep neural network obtained by a method based on a deep learning model;

(2) if S(p1,p2)>Ts, a distance between p1 and p2 is calculated, p1 and p2 are marked as pixels with depth estimation, and the depth is assigned to p1, where Ts is an image similarity threshold; and, if S(p1,p2)<Ts, both p1 and p2 are marked as pixels without depth estimation;

(3) for an image pixel p2 with depth estimation among the pixels in the OImage 2, the most similar pixel is found in the same way as in the step (2), and this image pixel is marked as a pixel without depth estimation if the found most similar pixel is not p1; and (4) an omnidirectional depth image OImageD is output, wherein the omnidirectional depth image contains all pixels with depth estimation, and the pixel value is a depth value from the object to the system.

In accordance with the above operations (1), (2), (3) and (4), the OImageD may contain pixels without depth values.

Wherein, in the stereoscopic matching unit based on a DNN, an image feature extraction model most suitable for stereoscopic image matching is obtained by learning a large number of stereoscopic image training data. Specifically, the DNN model contains multiple layers of neural networks, and there is an edge link with a weight between the multiple layers of networks. An input layer of the DNN model is two images which respectively correspond to two image windows of a same size truncated from the upper-viewpoint omnidirectional image and the lower-viewpoint omnidirectional image, and an output layer of the DNN model is a floating point number output from 0 to 1. In this embodiment of the present invention, during the training of the DNN model, the training sample is an image pair with a real tag value. Two images in the image pair are image windows of a same size truncated from the upper-viewpoint omnidirectional image and the lower-viewpoint omnidirectional image, respectively. When the two window images correspond to a same object in the space and contain a same position range, the tag value is 1; or otherwise, the tag value is 0.

Wherein, for the object image segmentation unit based on a DNN, this unit comprises a DNN model for segmenting an image. This model segments the image into different regions which are not overlapped with each other, and the different regions correspond to different objects, for example, a person, a desk, a road, a bicycle or more. Specifically, this DNN model contains multiple layers of neural networks, and there is an edge link with a weight between the multiple layers of networks. An input layer of this model is an image, and an output layer thereof is an image having the same size as the input image. Each pixel of this image is an integer value representing the category of the object, and different integer values correspond to different categories of objects.

Wherein, the semantic depth image generation unit generates semantic depth images. Specifically, based on the result of segmentation obtained by DNN image segmentation, each segmented region in the image corresponds to an object, and a three dimensional model of this object can be obtained by retrieving from a three dimensional model database. A three dimensional pose of this object in the image can be estimated from the depth image OImageD obtained by the depth image estimation unit based on stereoscopic matching and the depth information distribution about this object, and the three dimensional model of this object is then projected onto the image according to the three dimensional pose. Thus, the depth information of each pixel within the image region can be obtained, and object category information of each pixel in the image can also be obtained. Therefore, this image is called a semantic depth image.

Further, for a region having a too small area or no depth estimation, the semantic depth image generation unit may not be able to generate any result, nearest neighbor interpolation is performed on these regions, and these regions are filled with a region having a depth estimation value in a neighborhood. Thus, an omnidirectional dense depth image with each pixel having a depth value can be generated as an output of the result output unit. In other words, the information finally output by the deep neural network is an omnidirectional dense depth image with each pixel having a depth value.

Step 2022: One or two third omnidirectional videos are determined according to the second omnidirectional video and the omnidirectional depth video.

Wherein, the step 2022 specifically comprises steps S1 to S3 (not shown), wherein:

Step S1: Depth information corresponding to a first pixel point in the determined omnidirectional depth video is determined, and a horizontal epipolar line is determined according to the first pixel point.

Wherein, the first pixel point is in the second omnidirectional video.

Step S2: A second pixel point's image position is determined according to the depth information corresponding to the first pixel point in the determined omnidirectional depth video and the horizontal epipolar line. The color of the second pixel point is the same as that of the first pixel point.

Step S3: The steps S1 to S2 are circulated until a third omnidirectional video is obtained.

Wherein, the third omnidirectional video consists of all the determined second pixel points.

Figure 5A:
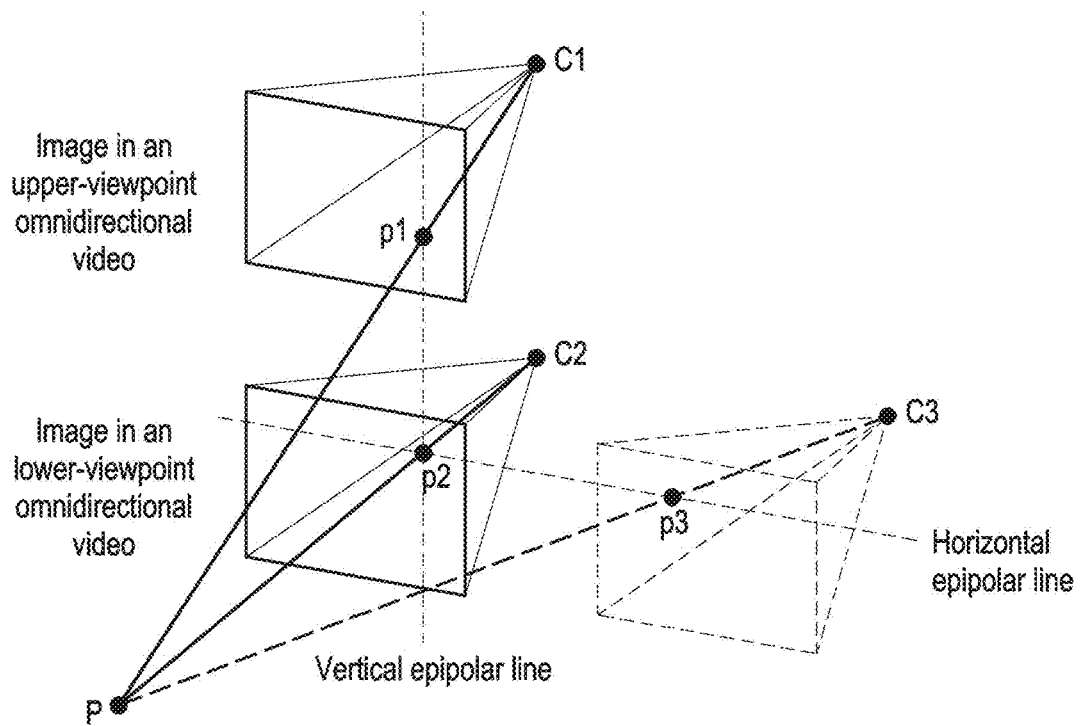
FIG. 5a is a schematic diagram of a method for converting two omnidirectional videos in a same vertical direction into two omnidirectional videos in a same horizontal direction according to an embodiment of the present invention.

In this embodiment of the present invention, as shown in FIG. 5a, for a pixel point p2 in the left-viewpoint omnidirectional video (which can be considered as example of the aforementioned second omnidirectional video), it can be known that an object point P corresponding to this pixel is located in a half-line determined by a connection line of the optical center C2 of the left-viewpoint omnidirectional image and the pixel p2. By using the depth value in the omnidirectional depth video, the position of the point P in the half-line can be known, that is, the position of the point P in the three dimensional space is known. Then, this point P is projected to a "right-viewpoint video acquisition equipment" (which can be considered as example of part of the aforementioned third omnidirectional video) to obtain a pixel position p3 in the image plane of the "right-viewpoint video acquisition equipment". For example, for a virtual "right-viewpoint video acquisition equipment" C3, this video acquisition equipment has the same internal imaging parameters as the left-viewpoint video acquisition equipment, including the focal length, resolution and principal point. Wherein, C3 is located in a line that passes through C2 and is perpendicular to the plane P-C2-p2, and the distance between C3 and C2 is a set display stereoscopic baseline length, where the display stereoscopic baseline length can be equal to the length of the average pupil distance of human eyes or can also be adjusted according to the pupil distance of a user, and the pixel color of p3 is equal to the pixel color of p2.

Wherein, the step 2022 can further specifically comprise steps S4 to S8 (not shown), wherein:

Step S4: A third pixel point and depth information corresponding to the third pixel point in the omnidirectional depth video are determined.

Wherein, the third pixel point is in the second omnidirectional video.

Step S5: A vertical stereoscopic parallax is determined according to the third pixel point and the depth information corresponding to the third pixel point in the omnidirectional depth video.

Step S6: A horizontal stereoscopic parallax corresponding to the vertical stereoscopic parallax is determined according to the vertical stereoscopic parallax.

Step S7: A fourth pixel point is obtained according to the horizontal stereoscopic parallax and the third pixel point.

Step S8: The steps S4 to S7 are circulated until the third omnidirectional video is obtained.

Wherein, the third omnidirectional video consists of all the determined fourth pixel points.

Figure 5B:
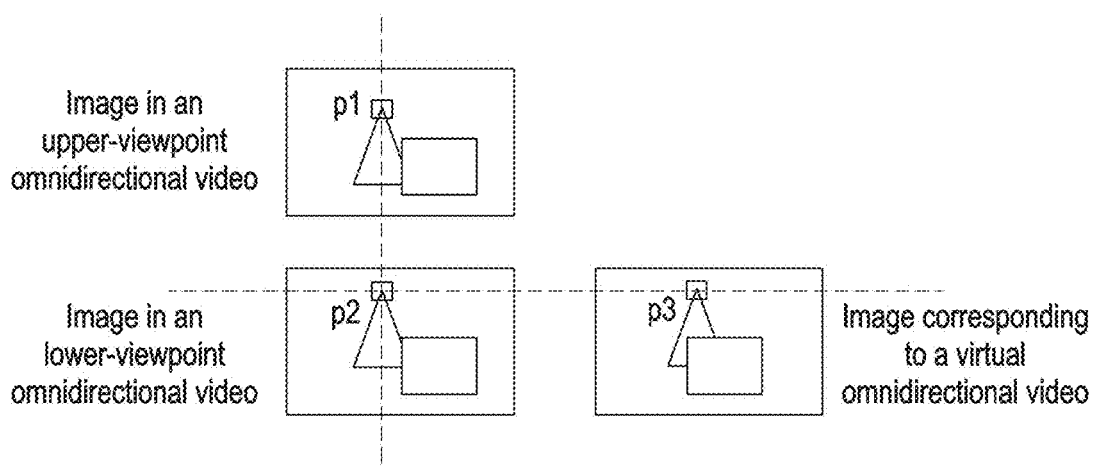
FIG. 5b is a schematic diagram of another method for converting two omnidirectional videos in a same vertical direction into two omnidirectional videos in a same horizontal direction according to an embodiment of the present invention.

For example, the third pixel point is marked as P2 and the depth value of P2 in the depth image is D2, the vertical stereoscopic parallax corresponding to this pixel point is calculated as $D_{UD}(p2)=f*B_{UD}(D2)$, where f is the focal length of the video acquisition equipments, and $B_{UD}$ is the length of the baseline between the upper and lower video acquisition equipments. Then, based on the vertical stereoscopic parallax $D_{UD}(p2)$ corresponding to this pixel point, the horizontal stereoscopic parallax is calculated as $D_{LR}(p2)=D_{UD}(p2)*(B_{LR}/B_{UD})$, where $B_{LR}$ denotes the length of the baseline between the left and right stereoscopic images. The color of the pixel p2 is drawn to a corresponding position in the right-viewpoint omnidirectional image according to $D_{LR}(p2)$. Wherein, $B_{LR}$ can be set as the length of the average pupil distance of human eyes or can also be adjusted according to the pupil distance of a user. The above steps are iterated until a virtual omnidirectional video is obtained, as shown in FIG. 5b.

Figure 6:
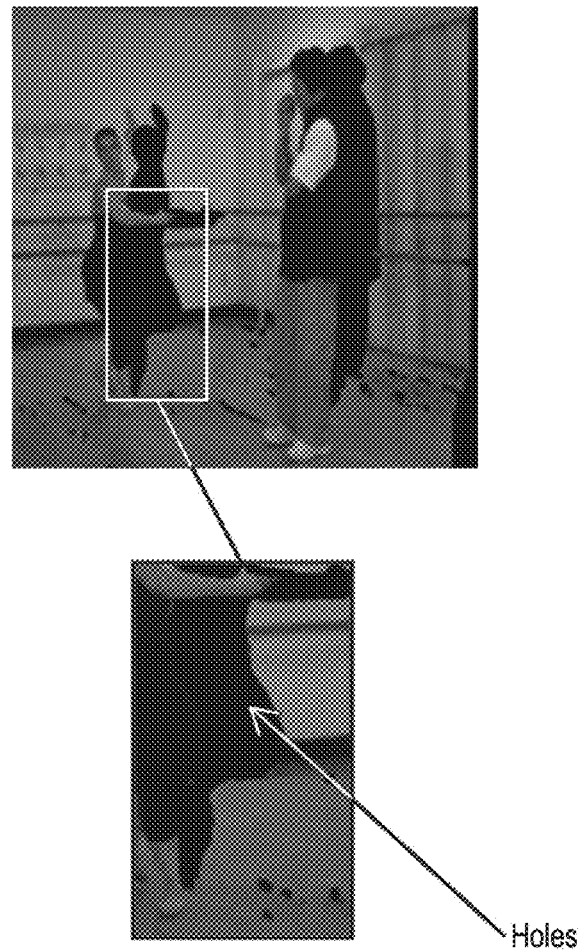
FIG. 6 is a schematic diagram of the presence of a black hole region in the generated virtual omnidirectional video according to an embodiment of the present invention.
Figure 7:
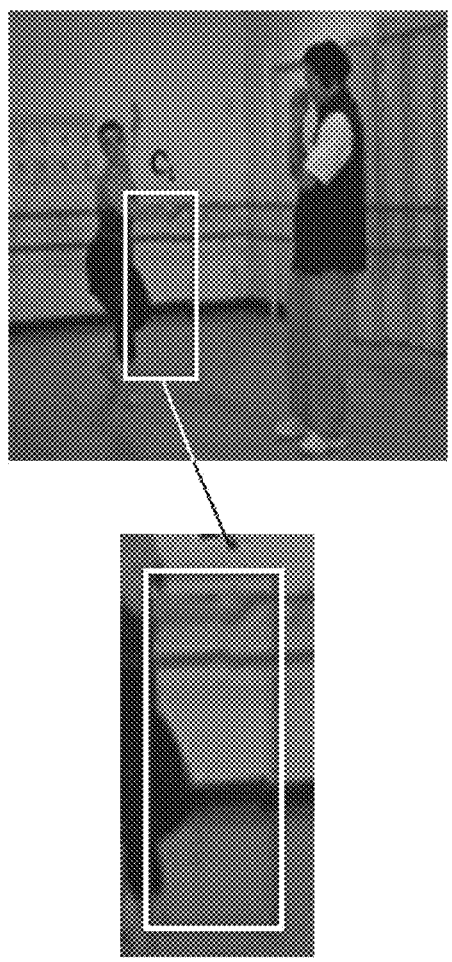
FIG. 7 is a schematic diagram of the hole-filled virtual omnidirectional video according to an embodiment of the present invention.

In the virtual omnidirectional video generated by the method, since there may be some black hole regions in which no pixel is projected effectively, as shown in FIG. 6, object surface parts corresponding to these regions are present at observation viewpoint corresponding to the virtual omnidirectional video, but the same object surface parts are not present at observation viewpoint corresponding to the second omnidirectional video due to the occlusion of foreground objects. To generate a complete virtual omnidirectional video, image filling needs to be performed on these black hole regions to obtain a filled image, as shown in FIG. 7.

Optionally, after the step 2022, the method can further comprise: performing hole filling on the determined third omnidirectional video to obtain a hole-filled third omnidirectional video.

In this embodiment of the present invention, since the determined third omnidirectional video may have some black hole regions in which no pixel is projected effectively, hole filling needs to be performed on the third omnidirectional video.

Wherein, the step of performing hole filling on the determined third omnidirectional video to obtain a hole-filled third omnidirectional video comprises steps S9 to S13 (not shown).

Step S9: A first omnidirectional image and a second omnidirectional image corresponding to the first omnidirectional image are determined.

Wherein, the first omnidirectional image belongs to the first omnidirectional video and the second omnidirectional image belongs to the second omnidirectional video.

Step S10: Image windows of a same size are truncated from the first omnidirectional image and the second omnidirectional image to obtain a first window image and a second window image, respectively.

Step S11: Based on a generative-adversarial net, the first window image and the second window image, a third image corresponding to the second window image is generated.

Wherein, the generative-adversarial net comprises an encoding network that transforms input in a layer by layer manner to become high-level semantic features at low resolution and a decoding network that transforms input in a layer-by-layer manner to become low-level image features with high resolution.

Step S12: Frame images corresponding to the generated third image are determined in the third omnidirectional video, and hole filling is performed on the determined frame images.

Step S13: The steps S9 to S12 are circulated until the hole filling for each frame image in the third omnidirectional video is completed.

Wherein, the step of performing hole filling on the determined third omnidirectional video to obtain a hole-filled third omnidirectional video comprises: determining a filling strategy respectively corresponding to each frame image to be hole-filled in the determined third omnidirectional video; and, performing hole filling according to the filling strategy to obtain the hole-filled third omnidirectional video.

Further, the step of determining a filling strategy respectively corresponding to each frame image to be hole-filled in the determined third omnidirectional video can specifically comprise: inputting a preset number of images before each frame image to be hole-filled in the determined third omnidirectional video into the generative-adversarial net to obtain a filling strategy respectively corresponding to each frame image to be hole-filled in the determined third omnidirectional video.

In this embodiment of the present invention, a simplified image filling way is as follows: selecting a nearest pixel from pixels around a hole, and directly copying the color of this pixel to the hole.

For example, a specifically method can comprise the following steps.

(1) A row of pixels within a hole region are selected, and a left boundary pixel and a right boundary pixel in this row of pixels are found. Among the left and right boundary pixels, a pixel farthest away from the video acquisition equipment is determined according the depth information, and a brightness value of this pixel is assigned to all pixel values in this row of pixels.

(2) The operation in the step (1) is performed on all rows in all hole regions of the image.

This embodiment of the present invention further provides a filling method which is a method based on a deep neural network model. In this method, a network structure similar to the Generative-Adversarial Net (GAN) is used.

Wherein, this GAN model contains a multiple of neural networks, and there is an edge link with a weight between the multiple layers of networks. Among the networks, the first half of networks close to the input layer have a structure in which the number of neural networks in each layer decreases gradually, and are called encoding networks which can learn features (e.g., object category, nature or more) having high-level semantic attributes in the image. Among the networks, the remaining half of networks close to the output layer have a structure in which the number of neural networks in each layer increases gradually, and are called decoding networks which can learn features (e.g., image color, texture or more) having low-level image attributes in the image.

Wherein, the input layer of this model is two images which correspond to two image windows of a same size truncated from the upper-viewpoint omnidirectional image and the lower-viewpoint omnidirectional image, respectively. The output layer of this model is an image having the same size as the input image, and this image is a right-viewpoint omnidirectional image corresponding to the image window in the lower-viewpoint omnidirectional image. When in use, an image region in the generated right-viewpoint omnidirectional image corresponding to a hole region is filled into the hole region, wherein the upper-viewpoint omnidirectional image belongs to the upper-viewpoint omnidirectional video and the lower-viewpoint image belongs to the lower-viewpoint omnidirectional video.

Wherein, during the training of this model, the input of each set of training samples is the upper-viewpoint omnidirectional image and the lower-viewpoint omnidirectional image, while the output thereof is the right-viewpoint omnidirectional image. The training samples are generated by two methods.

Method 1: Training images are taken by three video acquisition equipments. Specifically, the three video acquisition equipments are located in a same vertical direction, and are arranged at an upper position, a lower position and a right position and fixed by a mechanical device, as shown in FIG. 8. Wherein, the video acquisition equipments at the upper position and the lower position generate a pair of upper and lower stereoscopic images, the video acquisition equipments at the lower position and the right position generate a pair of left and right stereoscopic images. The equipments are placed in various actual environments to take training images.

Method 2: Training images are generated by technical simulation in the computer graphics. Specifically, in a computer's three dimensional model world, three virtual video acquisition equipments are arranged. The three virtual video acquisition equipments are located in a same vertical direction, and arranged at an upper position, a lower position and a right position. Wherein, the video acquisition equipments at the upper position and the lower position generate a pair of upper and lower stereoscopic images, and the video acquisition equipments at the lower position and the right position generate a pair of left and right stereoscopic images, as shown in FIG. 9.

In this embodiment of the present invention, during the training of the generative-adversarial net, video training data is generated by using an equipment similar to the foregoing "image hole filling unit" or computer graphics environment. Each set of video training data comprises: an upper-viewpoint omnidirectional video, a lower-viewpoint omnidirectional video and a right-viewpoint omnidirectional video.

Wherein, this method comprises a set of image filling methods, and this set contains various image filling methods, for example, a filling method based on image neighborhood and a filling method based on GAN.

Wherein, the filling method based on image neighborhood may have various variants, for example, filling row by row and/or filling column by column, filling by copying color and/or filling by copying texture.

Wherein, the filling method based on GAN may have various variants. For example, training data for different scenarios and depth distributions is used during training, and the trained. GAN models have different filling ways.

In this embodiment of the present invention, a method for filling video holes is provided. Like an enhanced learning method, a strategy for filling video image holes is learned. When holes in each image among a series of videos are filled, an optimal filling method is selected from the set of image filling methods according to the features of hole region images in a number of frames before this frame, so that the visual continuity of the filled video in the time domain is ensured.

Specifically, S denotes the features of hole region images in a number of frames before this frame, a denotes a filling method in the set of image filling methods, $Q(S,a)$ denotes an estimated value of the continuity of the video obtained by performing the filling method a on the feature S, and $r(S,a)$ denotes an instant reward after this action. For example, $r(S,a)$ can be calculated as an image similarity score obtained by comparing the image at a moment t with the image at a moment t−1, after the image at a moment t is filled by the method a. This similarity score can be obtained by calculating a color similarity of each pixel within the filled region portion after image registration is performed on the two images.

Wherein, the learning process comprises the following steps:

(1) each combination of S and a is initialized, that is, $Q(S,a)=0$;

(2) the feature S at the current moment is obtained; and (3) the following steps a) to e) are repeated until the training of the video ends:

a) a method a0 for maximizing $Q(S,a)$ is selected;

b) image hole regions are filled by the method a0, and $r(S,a0)$ is calculated;

c) the feature S' at the next moment at the end of filling is acquired;

d) $Q(S,a)=r(Sa,0)+v*\max_a\{Q(S',a)\}$ is updated; and e) it is assumed that S=S'.

Wherein, v is used to denote a discount factor, where 0<v<1.

In this embodiment of the present invention, the holes in the video are filled by using the learned strategy Q(S,a).

In this embodiment of the present invention, in some application scenarios, for example, when a user takes a video during the movement, to ensure to output smooth omnidirectional videos, the taken first omnidirectional video and second omnidirectional video need to be processed, wherein the specific processing way is shown in a step 301 (not shown).

Step 301: The second omnidirectional video and/or the determined third omnidirectional video are/is stabilized.

In this embodiment of the present invention, the step 301 can comprise two situations:

situation 1: if only one third omnidirectional video is generated, the second omnidirectional video and the third omnidirectional video are stabilized; and situation 2: if two third omnidirectional videos are generated, the generated third omnidirectional videos are stabilized.

Wherein, the step 301 can specifically comprise a step 3011 (not shown).

Step 3011: The second omnidirectional video and/or the determined third omnidirectional video are/is rendered onto a stabilized target trajectory to obtain a stabilized second omnidirectional video and/or a stabilized third omnidirectional video.

Wherein, the way of determining the target video stabilization trajectory comprises: determining, according to the omnidirectional depth video, position information of a three dimensional environment model corresponding to each video acquisition equipment at each moment during its movement; determining, according to the position information of the three dimensional environment model corresponding to each video acquisition equipment at each moment during its movement, a three dimensional movement trajectory of the video acquisition equipment in a world coordinate system; and, filtering the three dimensional movement trajectory to obtain the target video stabilization trajectory.

In this embodiment of the present invention, the third omnidirectional video can be hole-filled before or after the step 3011. This will not be limited in this embodiment of the present invention.

Wherein, the hole filling way is the same as the hole filling way in the foregoing embodiment, and will not be repeated here.

This embodiment of the present invention provides a method for processing a video. Compared with the prior art, in this embodiment of the present invention, two omnidirectional videos (i.e., a first omnidirectional video and a second omnidirectional video, respectively) having a stereoscopic parallax in a first direction are acquired, and a third omnidirectional video is then determined according to the first omnidirectional video and the second omnidirectional video, wherein the second omnidirectional video and the third omnidirectional video have a stereoscopic parallax in a second direction. In other words, in this embodiment of the present invention, it is only required to acquire two omnidirectional videos having a stereoscopic parallax in a first direction. Subsequently, through omnidirectional video conversion from the stereoscopic parallax in the first direction to the stereoscopic parallax in the second direction, a third omnidirectional video in a same row direction of the second omnidirectional video can be obtained, or two third omnidirectional videos with stereoscopic parallax in a same row direction can be obtained. Thus, this provides for a possibility and premise guarantee for the combination of the second omnidirectional video and the third omnidirectional video to present a 3D omnidirectional video effect to a user or the combination of two third omnidirectional videos to present a 3D omnidirectional video effect to the user. Meanwhile, video acquisition can be completed by only two omnidirectional video acquisition equipments. This equipment structure can greatly decrease the size of the omnidirectional video acquisition equipments and reduce the cost. Thanks to the features of portability, small size and low cost of the omnidirectional video acquisition equipments, the application scenarios of the omnidirectional video acquisition equipments can be increased, and the user experience is thus improved.

Embodiment 2

This embodiment of the present invention provides a device for processing a video, as shown in FIG. 10, comprising an acquisition module 1001 and a determination module 1002, wherein:

the acquisition module 1001 is configured to acquire a first omnidirectional video and a second omnidirectional video;

wherein the first omnidirectional video and the second omnidirectional video have a stereoscopic parallax in a first direction, and the first direction is a corresponding column direction when the first omnidirectional video and the second omnidirectional video are unfolded by longitude and latitude; and the determination module 1002 is configured to determine one or two third omnidirectional videos according to the first omnidirectional video and the second omnidirectional video;

wherein, if one third omnidirectional video is determined, the second omnidirectional video and the third omnidirectional video have a stereoscopic parallax in a second direction; if two third omnidirectional videos are determined, the two third omnidirectional videos have a stereoscopic parallax in the second direction; and, the second direction is a corresponding row direction when the first omnidirectional video and the second omnidirectional video are unfolded by longitude and latitude.

This embodiment of the present invention provides a device for processing a video. Compared with the prior art, in this embodiment of the present invention, two omnidirectional videos (i.e., a first omnidirectional video and a second omnidirectional video, respectively) having a stereoscopic parallax in a first direction are acquired, and a third omnidirectional video is then determined according to the first omnidirectional video and the second omnidirectional video, wherein the second omnidirectional video and the third omnidirectional video have a stereoscopic parallax in a second direction. In other words, in this embodiment of the present invention, it is only required to acquire two omnidirectional videos having a stereoscopic parallax in a first direction. Subsequently, through omnidirectional video conversion from the stereoscopic parallax in the first direction to the stereoscopic parallax in the second direction, a third omnidirectional video in a same row direction of the second omnidirectional video can be obtained, or two third omnidirectional videos with stereoscopic parallax in a same row direction can be obtained. Thus, this provides for a possibility and premise guarantee for the combination of the second omnidirectional video and the third omnidirectional video to present a 3D omnidirectional video effect to a user or the combination of two third omnidirectional videos to present a 3D omnidirectional video effect to the user. Meanwhile, video acquisition can be completed by only two omnidirectional video acquisition equipments. This equipment structure can greatly decrease the size of the omnidirectional video acquisition equipments and reduce the cost. Thanks to the features of portability, small size and low cost of the omnidirectional video acquisition equipments, the application scenarios of the omnidirectional video acquisition equipments can be increased, and the user experience is thus improved.

The device for processing a video provided in this embodiment of the present invention can implement the method embodiments described above, and the specific function implementations refer to the descriptions in the method embodiments and will not be repeated here.

It should be understood by those skilled in the art that the present invention involves devices for carrying out one or more of operations as described in the present application. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present invention may be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method for processing a video, the method comprising:
   acquiring a first omnidirectional video and a second omnidirectional video, the first omnidirectional video and the second omnidirectional video having a stereoscopic parallax in a first direction, the first direction being a corresponding column direction when the first omnidirectional video and the second omnidirectional video are unfolded by longitude and latitude; and
   determining one or two third omnidirectional videos according to the first omnidirectional video and the second omnidirectional video, wherein, if one third omnidirectional video is determined, the second omnidirectional video and the third omnidirectional video have a stereoscopic parallax in a second direction, wherein if two third omnidirectional videos are determined, the two third omnidirectional videos have a stereoscopic parallax in the second direction, and wherein the second direction is a corresponding row direction when the first omnidirectional video and the second omnidirectional video are unfolded by longitude and latitude.

2. The method according to claim 1, wherein determining the one or two third omnidirectional videos according to the first omnidirectional video and the second omnidirectional video comprises:
   determining an omnidirectional depth video according to the first omnidirectional video and the second omnidirectional video; and
   determining the one or two third omnidirectional videos according to the second omnidirectional video and the omnidirectional depth video.

3. The method according to claim 1, wherein after determining the one or two third omnidirectional videos according to the first omnidirectional video and the second omnidirectional video, the method further comprises:
   performing hole filling on the determined third omnidirectional video to obtain a hole-filled third omnidirectional video.

4. The method according to claim 1, wherein after acquiring a first omnidirectional video and a second omnidirectional video, the method further comprises:
   calibrating the first omnidirectional video and the second omnidirectional video.

5. The method according to claim 4, wherein calibrating the first omnidirectional video and the second omnidirectional video comprises:
   determining, according to the first omnidirectional video and the second omnidirectional video, position and pose error parameters of video acquisition equipment corresponding to the first omnidirectional video and the second omnidirectional video;
   determining calibration parameters according to the position and pose error parameters; and
   calibrating the first omnidirectional video and the second omnidirectional video according to the calibration parameters.

6. The method according to claim 5, further comprising:
   synchronizing timestamps corresponding to the first omnidirectional video and the second omnidirectional video.

7. The method according to claim 1, wherein after determining one or two third omnidirectional videos according to the first omnidirectional video and the second omnidirectional video, the method further comprises:

increasing a resolution corresponding to the second omnidirectional video and/or the determined third omnidirectional video.

8. The method according to claim 2, wherein a trained deep neural network is used to determine the omnidirectional depth video according to the first omnidirectional video and the second omnidirectional video.

9. The method according to claim 8, further comprising:
determining pixel points in the second omnidirectional video matched with pixel points in the first omnidirectional video, based on the trained deep neural network;
determining depth information corresponding to each pair of matched pixel points;
performing, based on the deep neural network, semantic annotation on each pixel point in the second omnidirectional video; and
determining the omnidirectional depth video according to the depth information corresponding to the each pair of matched pixel points and the semantic annotation information corresponding to each pixel point in the second omnidirectional video.

10. The method according to claim 2, wherein determining the one or two third omnidirectional videos according to the second omnidirectional video and the omnidirectional depth video comprises:
determining depth information of a first pixel point, which is in the second omnidirectional video, in the determined omnidirectional depth video, and determining a horizontal epipolar line according to the first pixel point;
determining a second pixel point according to the depth information of the first pixel point in the determined omnidirectional depth video and the horizontal epipolar line; and
repeating determining the depth information, the horizontal epipolar line and the second pixel point until a third omnidirectional video is obtained, wherein the third omnidirectional video consists of all the determined second pixel points.

11. The method according to claim 2, wherein determining the third omnidirectional video according to the second omnidirectional video and the omnidirectional depth video comprises:
determining a third pixel point and depth information corresponding to the third pixel point, which is in the second omnidirectional video, in the omnidirectional depth video;
determining a vertical stereoscopic parallax according to the third pixel point and the depth information corresponding to the third pixel point in the omnidirectional depth video;
determining, according to the vertical stereoscopic parallax, a horizontal stereoscopic parallax corresponding to the vertical stereoscopic parallax;
obtaining at least one fourth pixel point according to the horizontal stereoscopic parallax and the third pixel point; and
repeating, until the third omnidirectional video is obtained, determining the third pixel point and the depth information, determining the vertical stereoscopic parallax, determining the horizontal stereoscopic parallax, and obtaining the fourth pixel point, wherein the third omnidirectional video consists of the at least one determined fourth pixel point.

12. The method according to claim 3, wherein performing hole filling on the determined third omnidirectional video to obtain the hole-filled third omnidirectional video comprises:
determining a first omnidirectional image and a second omnidirectional image corresponding to the first omnidirectional image, wherein the first omnidirectional image belongs to the first omnidirectional video and the second omnidirectional image belongs to the second omnidirectional video;
truncating image windows of a same size from the first omnidirectional image and the second omnidirectional image to obtain a first window image and a second window image, respectively;
based on a generative-adversarial net, the first window image and the second window image, generating a third image corresponding to the second window image, the generative-adversarial net comprising an encoding network having a high-level semantic attribute and a decoding network having a low-level image attribute;
determining, in the determined third omnidirectional video, frame images corresponding to the generated third image, and performing hole filling on the determined frame images; and
repeating, until the hole filling of each frame image in the determined third omnidirectional video is completed, determining the first omnidirectional image and the second omnidirectional image, truncating the image windows, generating the third image, determining the frame images, and performing hole filling.

13. The method according to claim 3, wherein performing hole filling on the determined third omnidirectional video to obtain the hole-filled third omnidirectional video comprises:
determining a filling strategy for each frame image to be hole-filled in the determined third omnidirectional video; and
performing hole filling according to the filling strategy to obtain a hole-filled third omnidirectional video.

14. The method according to claim 13, wherein determining the filling strategy for each frame image to be hole-filled in the determined third omnidirectional video comprises:
inputting a preset number of images before each frame image to be hole-filled in the determined third omnidirectional video into the generative-adversarial net to obtain a filling strategy corresponding to each frame image to be hole-filled in the third omnidirectional video.

15. The method according to claim 1, further comprising:
stabilizing the second omnidirectional video and/or the determined third omnidirectional video.

16. The method according to claim 15, wherein stabilizing the second omnidirectional video and/or the determined third omnidirectional video comprises:
rendering the second omnidirectional video and/or the determined third omnidirectional video onto a stabilized target trajectory to obtain a stabilized second omnidirectional video and/or a stabilized third omnidirectional video.

17. The method according to claim 16, wherein determining the target video stabilization trajectory comprises:
determining, according to the omnidirectional depth video, position information of a three dimensional environment model corresponding to each video acquisition equipment at each moment during its movement;
determining, according to the position information of the three dimensional environment model corresponding to each video acquisition equipment at each moment during its movement, a three dimensional movement trajectory of the video acquisition equipment in a world coordinate system; and filtering the three dimensional movement trajectory to obtain the target video stabilization trajectory.

18. A device for processing a video, the device comprising:

an acquisition module configured to acquire a first omnidirectional video and a second omnidirectional video, the first omnidirectional video and the second omnidirectional video having a stereoscopic parallax in a first direction, the first direction being a corresponding column direction when the first omnidirectional video and the second omnidirectional video are unfolded by longitude and latitude; and a determination module configured to determine one or two third omnidirectional videos according to the first omnidirectional video and the second omnidirectional video, wherein, if one third omnidirectional video is determined, the second omnidirectional video and the third omnidirectional video have a stereoscopic parallax in a second direction, wherein if two third omnidirectional videos are determined, the two third omnidirectional videos have a stereoscopic parallax in the second direction, and wherein the second direction is a corresponding row direction when the first omnidirectional video and the second omnidirectional video are unfolded by longitude and latitude.

* * * * *